Nov. 18, 1969 D. D. TECH 3,479,605

DISPLAY FORMATING CONTROL

Filed March 30, 1966 2 Sheets-Sheet 1

INVENTOR
DONALD D. TECH

BY Frederick D. Poag

ATTORNEY

United States Patent Office 3,479,605
Patented Nov. 18, 1969

3,479,605

DISPLAY FORMATING CONTROL

Donald D. Tech, Red Hook, N.Y., assignor to International Business Machines Corporation, Armonk, N.Y., a corporation of New York Filed Mar. 30, 1966, Ser. No. 538,680
Int. Cl. H03k *3/53*
U.S. Cl. 328—186 10 Claims

ABSTRACT OF THE DISCLOSURE

In the raster scan deflection circuits of a CRT display, non-linearity in the deflection amplifier leading to overall distortion in a staircase ramp is compensated for by feedback from the output of the amplifier to the basic ramp signal. However, non-linearity of the amplifier with respect to its amplification of the staircase modulation superimposed on the basic ramp is overcome, not by feedback, but by a separate shaping of the amplitude of the modulating signal to define an envelope which is complimentary to the non-linearity to be corrected. This shaping is provided by an additional saw tooth generator which is operated by and in synchronism with the amplifier output and serves as a power supply for the modulation generator.

This invention relates to display systems and more particularly to an improved cathode ray deflection control system for use in an alpha-numeric display or the like.

When cathode ray tube displays are used as data output devices, there are certain requirements for control of the cathode ray beam which are different from those in other cathode ray tube devices such as television or oscilloscopes. In some cases these special requirements of data output displays derive in part from the characteristics of the data processing equipment which drives the display and in other cases the requirements may derive from the format of the information to be shown by the display.

For example, the display may be designed to provide a television-type raster upon which alpha-numeric characters are displayed by selective unblanking of the cathode ray. Since the characters are intended to be shown in a regular format, there are certain parts of the display screen upon which no characters will occur, and therefore it is unnecessary to provide raster lines in those areas. Moreover, in some displays it would be wasteful of equipment as well as time to utilize a completely regular raster pattern.

For example, where a vertical raster is utilized to generate horizontal rows of characters, the space between each character may be provided by a blanking signal emanating from the same equipment which provides the unblanking signals for display of the characters. If this blanking signal persisted for one regular raster line, the characters might be considered too close together for favorable readability. If more than one blanked raster line were used, the control equipment for this purpose would generally be enlarged or at least made more complicated. A solution to this problem resides in employing a staircase horizontal deflection signal in which the characters are displayed on raster lines which are, in effect, squeezed together by operation of low slope parts of the staircase signal, and spaces between characters are enlarged by operation of the high slope portions of the staircase.

In order to provide a display of regular format, it is necessary to see to it that there are no undesired non-linearities in these deflection circuits. For an economical circuit design, it may be desirable to utilize a single amplifier for the basic ramp of the aforesaid deflection signal and the staircase modulation superimposed thereupon and, moreover, it is desirable to use the smallest power capacity elements which will or can be made to perform satisfactorily in the circuit. This may result in driving some of these elements into non-linear regions of their operation and require circuitry for correcting this non-linearity. It has been found that to correct the non-linearity of the overall ramp and also the non-linearity of the relatively high frequency staircase modulation thereon in the same operating circuit presents a problem.

In accordance with the present invention the problems of linearizing the ramp and staircase wave shape components may be dealt with separately so that the problems attendant to non-linearity correction are simplified. In one embodiment of the invention, non-linearity in the deflection circuits leading to distortion in the ramp wave shape are compensated for by the introduction of complementary non-linearity in the input corresponding to this waveshape. This may be provided by feedback in the circuitry. At the same time, the problems of non-linearity of this circuitry with respect to the staircase modulation signal are overcome, not by the feedback, but by shaping the amplitude of the modulating signal to define an envelope which is complimentary to the non-linearities to be corrected.

In accordance with a further aspect of the invention, the aforesaid envelope is provided by a sawtooth generator which is operated in synchronism with the ramp and serves as a power supply for the modulation signal generator. In accordance with still another aspect of the invention, the aforesaid sawtooth generator may itself be powered by the output of the deflection circuit, as a convenient source of power and synchronization.

Accordingly, it is a primary object of the invention to provide improved display apparatus characterized by accurately controlled display beam deflection means enabling precise formating of the display image.

Another object of the invention is to provide deflection circuitry for use in a display system as aforesaid which is productive of desirably linear results in an efficient and economical manner.

Still another object of the invention is to provide circuitry as aforesaid including modulating means for superimposing a staircase configuration on a ramp signal of the deflection means together with modifying means which alters the operation of the modulating means on a time base corresponding to that of the ramp, so as to compensate for non-linearity in the deflection signal circuitry.

The foregoing and other objects, features and advantages of the invention will be apparent from the following more particular description of a preferred embodiment of the invention, as illustrated in the accompanying drawings.

Figure 1:
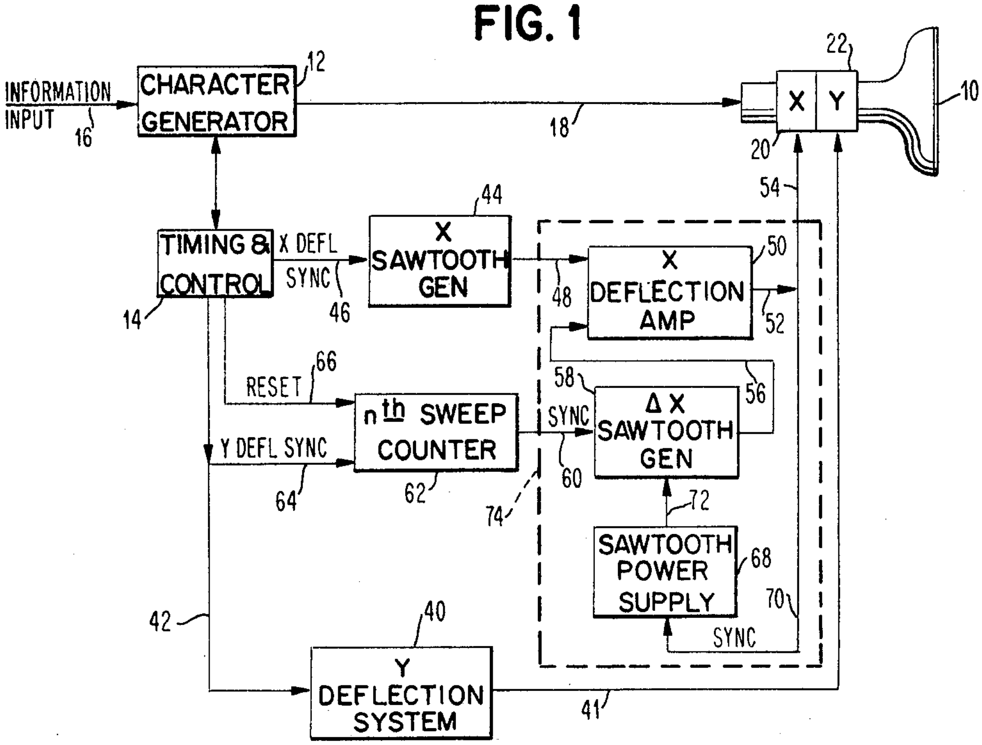
FIG. 1 is a schematic diagram of a display system incorporating a preferred embodiment of the invention.

The schematic diagram of FIG. 1 represents, in a simplified fashion, a typical display system which may be made to perform in an improved manner in accordance with principles of the invention. The illustrated display system comprises a cathode ray tube 10, operable in response to signals from a character generator 12 and timing and control means 14 to display information in a predetermined manner, or example, in horizontal lines of spaced alphanumeric characters. The character generator 12 may be of the kind which decodes input information on signal channel 16 and translates this information into a suitable blank unblank video signal on line 18 for operation of the cathode ray tube 10, in coordination with deflection of the beam by means of X and Y yokes 20, 22 operated by the timing and control circuits 14 in a manner to be described. As one example, the character generator may be of the general kind shown in U.S. Patent application Ser. No. 496,016 filed Oct. 14, 1965, and assigned to the assignee of this application.

Figure 2:
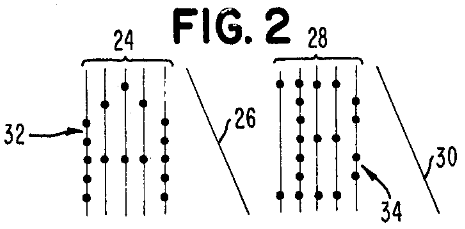
FIG. 2 is a fragmentary illustration of a portion of the display which may be generated by the system of FIG. 1, showing display formating characteristics obtainable by operation of features of the invention.

A display format which can be executed advantageously by operation of apparatus in accordance with the invention is shown in FIG. 2. In this mode of operation, the cathode ray path (that is the trace path which the ray would make if it were unblanked) can be arranged to form a vertical raster characterized by a group of, for example, five vertical raster lines 24, followed by an oblique raster line 26 serving as a spacer before the next group of nearly vertical raster lines 28. Following the group of lines 28, there may be another oblique raster line 30 followed by still another group of nearly vertical raster lines (not shown) and so on. The character generator 12 may be designed to display luminous dots in the raster pattern forming, for example, the character A32 followed after a space by the character B34, or any other characters called for by the message to be displayed. The improvements of the present invention are centered in circuitries which provide the required raster configuration with suitable precision.

The desired raster configuration can be provided by utilizing, in conjunction with a conventional sawtooth vertical (Y) deflection system, a "staircase" horizontal (X) deflection system wherein the "steps" of the staircase each comprise a small slope for generation of a closely bunched group of vertical raster lines (e.g., 24) and a steep slope for an associated oblique raster line (e.g., 26).

Accordingly, the system of FIG. 1 may include a Y deflection system 40 which may comprise, for example, a sawtooth generator (not shown) operated in a properly timed relation by a Y deflection sync signal provided by the timing and control circuitry 14 via line 42, so as to provide a series of ramp signals to the Y deflection yoke 22. This Y deflection arrangement may be similar to the horizontal deflection system seen in ordinary television receivers, where the raster is a horizontal rather than vertical one as in the present illustration.

As is usual in raster generating systems, the raster line separation is provided by a second ramp signal generator arranged to provide deflection transversely of the direction of the raster lines. Such a ramp can be provided, for example, by a sawtooth generator 44 operated in properly timed relation by a "X deflection sync" signal provided by the timing and control apparatus 14 via line 46, the ramp signal being fed via line 48 to an X deflection amplifier 50 and supplied, as modified by that amplifier to the X deflection yoke 20 via signal channels 52 and 54.

In the illustrated system, the modification effected by the deflection amplifier 50 includes modulation of the ramp to give it the above described "staircase" configuration. Accordingly, the deflection amplifier 50 may have a modulating ($\Delta X$) input on line 56 supplied from a sawtooth generator 58 which is operated, by means of a sync input 60, to yield a modulating ramp signal for every $n$ raster lines. This synchronizing signal can, of course, be derived from the master timing and control circuitry 14, but for purposes of illustration, it is shown as being derived from an $n$ stage counter 62 which itself is stepped by the "Y deflection sync" signal on line 64. For example, the raster arrangement shown in FIG. 2 comprises five vertical sweeps during a period of relatively slow horizontal displacement to provide relative compression of five raster lines forming the locus of a character, followed by a sixth vertical sweep which is to be executed during a relatively high rate of horizontal deflection to provide a relatively large space between characters, and so on, as aforedescribed. Accordingly in such an example, $n$ would be six because it is upon every sixth vertical sweep that resetting of the modulating sawtooth generator 58 would be desired, with attendant relatively high rate of horizontal deflection.

Of course, in a system including the separate counter 62 for this purpose, it would be desirable to provide a reset signal on line 66, to synchronize initially the operation of the counter 62 with that of the character generator 12 to insure that the characters to be displayed do indeed fall on the desired concentrated raster regions 24, 28 etc.

In accordance with the invention, means are provided to vary the output provided by the modulating sawtooth generator 58, in a pattern which compensates for nonlinearity in the operation of other parts of the apparatus, such as in the X deflection amplifier 50. In the illustrated apparatus, this means comprises a sawtooth generator 68, operated in synchronism with the deflection amplifier 50 via a signal on line 70 from the output 52 thereof, and acting as a power supply for the modulating sawtooth generator 58, via line 72.

Figure 3:
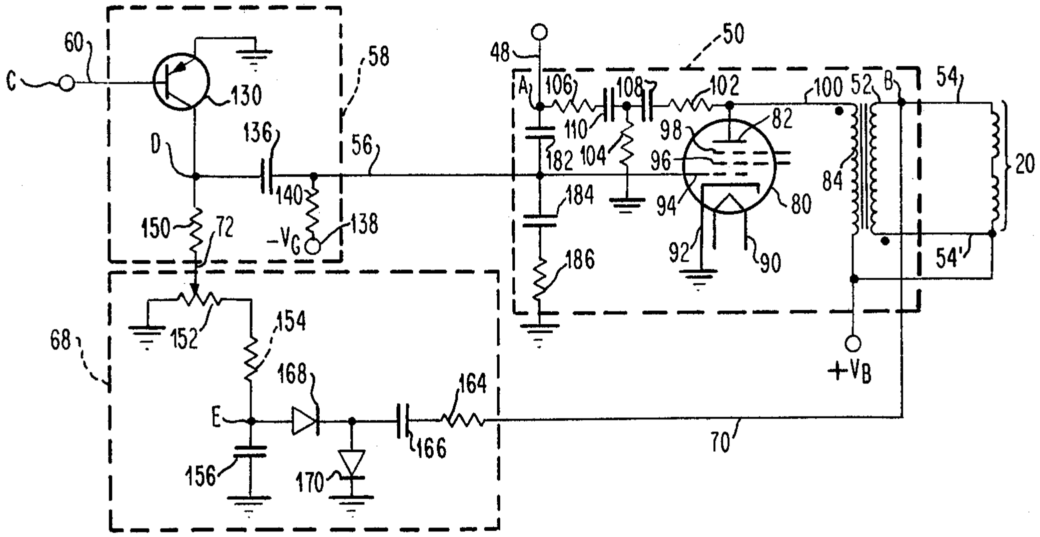
FIG. 3 is a circuit diagram of portions of the system of FIG. 1 which operate to provide the desired linearity in the display formating.
Figure 4:
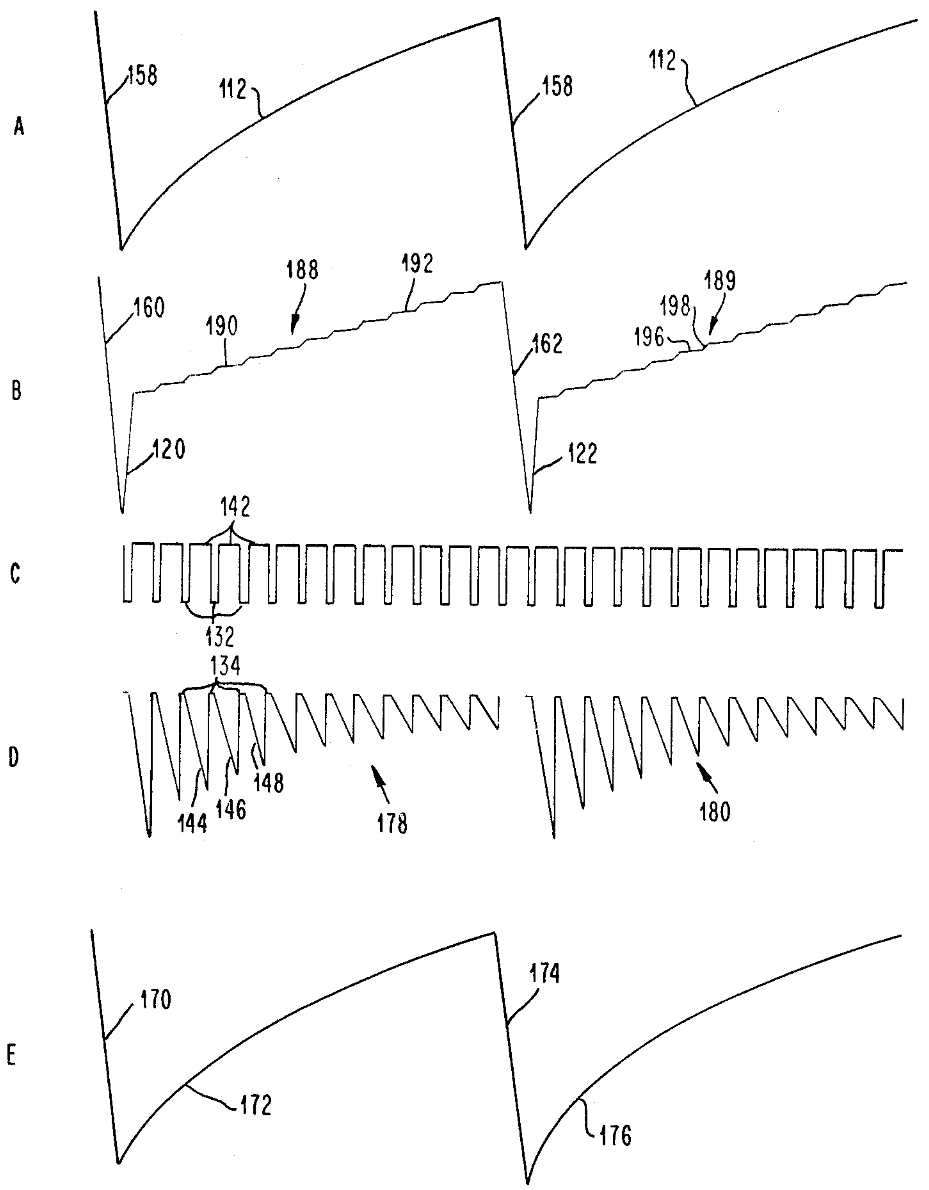
FIG. 4 shows a set of operating curves which are illustrative of the operation of the circuits of FIG. 3.

The operation of these circuits will be understood more readily by reference to FIG. 3 which shows circuit diagrams of preferred circuitries corresponding to parts of the system lying within the dotted box 74 of FIG. 1, and by reference to the operating curves shown in FIG. 4. The curves in FIG. 4 are labeled A, B, C, D and E, and are representative of voltage curves seen at correspondingly referenced points in the circuits of FIG. 3. It should be noted however that these curves are drawn for illustration purposes only and do not necessarily bear a true amplitude relationship one to the other.

Referring to FIG. 3, the amplifier 50 may comprise a vacuum tube such as a pentode 80. For reducing the current requirement at the plate 82 of the tube, the output of the circuit may be taken through a step down auto-transformer 84, the secondary output lines 54, 54' constitute the actual output of the circuit, as seen at 54, FIG. 1. As shown in FIG. 3, this output is connected to drive the X deflection yoke winding 20, and is also taken via line 70 as a synchronizing (and power supplying) signal for circuit 68.

The pentode 80 is illustrated to have, in addition to the plate 82, the usual filament 90, cathode 92, control grid 94, screen grid 96, and suppressor grid 98 elements but, for simplicity, no circuit connections are shown to the filament or screen or suppressor grids since those elements operate in the usual manner of a pentode amplifier.

In addition to being fed to the output transformer 84 via a line 100, the plate signal is applied through a feedback network comprising resistors 102, 104, 106 and capacitors 108 and 110 to point A in the input circuit of the amplifier. The general shape of the voltage curve seen at point A is shown in curve A of FIG. 4. The object of the non-linearity exhibited by the ramp portions 112 of curve A is to compensate for the non-linearity in the gain of tube 80 so that the net result is basically a linear ramp at the output of the amplifier 50. It its convenient to use a linear sawtooth generator 44 of conventional design, and the linear output of such a sawtooth generator is converted into the non-linear ramp shape shown in curve A by operation of the feedback circuit in amplifier 50. Of course, in lieu of merely adding the feedback signal algebraically to the (high impedance) output of the sawtooth generator as seen on line 48, other more sophisticated arrangements can be employed wherein the feedback circuit operates upon the charging level of the sawtooth generator, as may be desirable, but these details of operation of the sawtooth generator form no part of the present invention.

Whichever way the feedback path is employed, a problem exists in that it does not cure the non-linearity of amplifier 80 with respect to the modulating signal on line 56. If the illustrated feedback circuitry were made sensitive to high frequencies such as those present in the modulating sawtooth wave from the modulating signal generator 58, ringing signals such as may occur in operation of the transformer 84 at the end of each major X deflection ramp (as seen for example in curve B at 120, 122) might operate to yield excessive or even destructive feedback signals. To prevent this, the values of capacitors 108, 110 are kept low enough to block such transient signals.

Accordingly, in accordance with the invention, instead of attempting the use of feedback to linearize modulation, the modulation sawtooth generator 58 itself is operated in a non-linearity compensating manner. In the illustrated circuit this generator 58 comprises a PNP transistor 130 operated in grounded emitter configuration, with base control being provided on liner 60 by the pulses 132 (curve C, FIG. 4) issued by counter 62 at the time of each *n*th Y sweep. This operation clamps the collector of transistor 130 (point D, FIG. 3) to ground as seen at 134, curve D, and operates to bring capacitor 136 to its relatively discharged condition. The capacitor is not fully discharged because the other side of it is maintained at a negative value by operation of the grid bias supply 138 and grid leak resistor 140 of tube 80.

After the pulse 132 at point C terminates, for example during the times shown at 142, curve C, transistor 130 is shut off and capacitor 136 begins to recharge by operation of power supply 68. This provides a ramp signal 144, 146, 148 after each *n*th sweep signal 132, the slope of the ramp being determined by the capacitor 136, the resistance in the charging path including resistor 150, potentiometer 152 and resistor 154, and the charge on the capacitor 156 in power supply circuit 68.

The capacitor 156 is charged cyclically, once per major deflection in the X direction, that is once per ramp of the X deflection system. For this purpose, the output of the X deflection amplifier provides a convenient source of synchronization and power for operation of the circuit 68. Referring to FIG. 4 curve B, it will be seen that the cutoff of the circuit at the end of each ramp produces a sharp negative-going transient 160, 162. This transient is utilized in the illustrated embodiment of the invention to charge the capacitor 156 through resistor 164, capacitor 166 and diode 168. After the charging transient, the coupling capacitor 166 is restored to its initial condition by current flow through a diode 170 to ground. Capacitor 156 discharges slowly through resistors 152, 154 and through circuit 58. The resulting charging and discharging cycle of capacitor 156 yields a generally R-C transient shaped voltage curve as seen at 170, 172 (and again at 174, 176) in curve E, FIG. 4.

An adjustable portion of this voltage is taken from the potentiometer arrangement comprising resistors 152 and 154 and fed through resistor 150 to point D in FIG. 3. As a result, the sawtooth operation of circuit 58, which results from the periodic discharge and recharge of capacitor 136 by operation of transistor 130, follows an envelope as seen at 178, 180 in curve D, FIG. 4 which has the shape of an R-C transient as the charge on capacitor 156 in power supply circuit 68 decays. Like the transients 112, 112 of curve A in FIG. 4, the envelopes 178, 180 of curve D are adjusted to compensate for the non-linearity of the gain of tube 80. Stated differently, the slopes of the curves 112, 112 and the envelopes 178, 180 vary in inverse relation to the slope of the gain of the tube 80. It will be understood that this relationship is approximate and that the curves shown are for purposes of illustration since there is necessarily an interaction between the inputs to tube 80, namely the sawtooth input at line 48, the feedback input at point A, the differentiating effect of grid leak resistor 140, and the effect of coupling capacitors 182 and 184 and the path to ground through resistor 186.

However, by proper choice of these elements and adjustment of the potentiometer 152 it is possible to obtain a staircase output at point B which has had eliminated from it, for practical purposes, the undesirable non-linearity in the operating characteristic of tube 80. In FIG. 4, this linearizing effect is shown in the staircase ramps 188, 189 which have an overall linearity, as determined by non-linearity compensation in the signal of curve A, and equality in the staircase steps 190, 192 within those ramps as determined by the non-linearity compensation in the signal of curve D. The result is a uniform array of raster line groups 24, 28 corresponding in their horizontal spacing to the low slope portions of the staircase as seen for example at 196 in curve B, with the groups being spread apart by uniform spacings as indicated by the intervening raster lines 26, 30 which display an increased horizontal component corresponding to the high slope portions of the staircase in curve B as seen for example at 198. It will be understood, that the specific showing of FIG. 2 is fragmentary and that the slope of lines 26, 30 is exaggerated for purposes of illustration.

Typical, though not limiting, values for the element and parameters in the circuits illustrated in FIG. 3 may be as follows:

TABLE I

| | |
|---|---|
| Capacitor [1] 182 | .1 microfarad. |
| Capacitor 136 | .001 microfarad. |
| Capacitor 166 | .1 microfarad. |
| Capacitor 156 | .1 microfarad. |
| Capacitor [1] 184 | .047 microfarad. |
| Resistor 150 | 200K ohms. |
| Potentiometer 152 | 100K ohms. |
| Resistor 154 | 75K ohms. |
| Resistor 140 | 1 megohms. |
| Resistor 186 | 1K ohms. |
| Resistor 164 | 4.3K ohms. |
| Diode 168 | 1N4005. |
| Diode 170 | 1N4005. |
| Pentode 80 | 21HB5. |
| PNP transistor 130 | 2N1303. |
| Plate supply $+V_B$ | 140 v. |
| Grid supply $-V_G$ | −20 v. |
| Transformer 84 | Turns ratio 3:1, for driving 16 m.h. 14 ohm at 30 c.p.s. |
| Winding 20 | Deflection yoke, 16 m.h., 14 ohms, damped with 440 ohms center tapped (not shown). |

[1] In the practical circuit described, capacitors 182, 184 may form the capacity of the RC ramp circuit of generator 44. Such a circuit may comprise a 4 megohm charge path for this capacity and a cyclically operated clamp on line 48 to ground. The 4 megohm resistor in parallel with the 182, 184 path provides the "high impedance output" of 44 referred to above.

By imparting a transient envelope to the modulating wave of curve D as aforedescribed it is possible to utilize a non-linear amplifier such as the circuit 50 in FIGS. 1 and 3 in cases, as explained above, where simple feedback or other shaping of the main ramp input to that circuit as shown in curve A of FIG. 4 would not suffice. While the aforedescribed operation of the invention yields a linear voltage ramp as shown in curve B, the invention is applicable also to those cases where the ramp is given a different over-all shape. For example, the ramp may be made to deviate from a straight line shape for the purpose of compensating for the inductance of the yoke winding 20 or for aberrations in the design of the cathode ray tube 10, and additions can be made in such event to the network of circuit 50 or in circuit 44 to impart this additional shaping. This does not eliminate the need for or utility in the provision of the features of circuit 68 as aforedescribed.

While the invention has been particularly shown and described with reference to a preferred embodiment thereof, it will be understood by those skilled in the art that various changes in form and details may be made therein without departing from the spirit and scope of the invention.

What is claimed is:

1. In a control system which produces a linearized staircase waveform for a deflectable beam display system, first means including non-linear operating means adapted to provide a linear first ramp waveform repetitive at a first rate, second means operative to provide a modulating signal repetitive a rate higher than said first rate and connected to alter operation of said first means for configuring the output of said first means with a modulation on said waveform corresponding to said modulating signal, and third means operative in coordination with said first means to alter the amplitude of said modulating signal in a pattern which compensates for non-linearity in the operation of said first means.

2. The combination of claim 1, wherein said second means comprises a ramp generator for cooperation with said first means to give said output of said first means a generally staircase configuration, and said third means is operative to make the steps of said staircase substantially equal throughout the output range of said first means.

3. The combination of claim 2, wherein said third means comprises a ramp generator.

4. The combination of claim 3, wherein said ramp generator of said third means comprises a resistor-capacitor network operable cyclicly by the output of said first means to yield a ramp transient in synchronism with said first ramp waveform.

5. In a control system which produces a linearized staircase waveform for a deflectable beam display system comprising first and second coordinate deflection means and control means for synchronizing said deflection means in accordance with a raster pattern, said first means comprising a primary deflection control means and generally staircase modulating deflection control means and non-linear operating mixer means responsive to said primary and modulating control means, said modulating means operating at a frequency substantially higher than said primary deflection control means, the improvement comprising, cyclicly operable amplitude control means connected in supervisory relation to said modulating means and responsive to operation of said synchronizing control means to vary the modulation means output amplitude applied to said mixer means in a predetermined pattern which compensates for non-linearity in the operation of said mixer means to thereby produce said linearized staircase waveform.

6. The combination of claim 5, wherein, said amplitude control means comprises a power supply for said modulating means.

7. The combination of claim 6, wherein, said power supply comprises a resistor-capacitor transient network including a capacitor and means to charge said capacitor in coordination with operation of said primary control means.

8. The combination of claim 5, wherein, each of said modulating means and said amplitude control means comprise a resistor-capacitor ramp generator.

9. The combination of claim 8, wherein, the ramp capacitor of said amplitude control generator is recharged cyclicly by the output of said mixer means.

10. The combination of claim 9, wherein, said synchronizing means is operative to actuate said second deflection means at a rate which is higher than that of said modulating means.

References Cited

UNITED STATES PATENTS

| | | | |
|---|---|---|---|
| 2,176,973 | 10/1939 | Bowman-Manifold | 328—181 X |
| 2,891,173 | 6/1959 | Helbig | 307—228 |
| 2,923,850 | 2/1960 | Raffensperger | 328—182 X |
| 3,058,012 | 10/1962 | Harling | 328—186 X |
| 3,201,611 | 8/1965 | Mollinga | 307—228 X |
| 3,302,040 | 1/1967 | Dryden | 307—228 |

JOHN S. HEYMAN, Primary Examiner

R. C. WOODBRIDGE, Assistant Examiner

U.S. Cl. X.R.

307—227, 228; 328—187, 59